SYSTEM FOR INTERROGATING REMOTE STATIONS VIA POWER LINES OF AN ELECTRICAL DISTRIBUTION NETWORK

Filed March 24, 1964

INVENTOR.
ALFRED SPÄLTI

BY Morgan Finnegan Durham & Pine

ATTORNEYS

May 20, 1969 A. SPÄLTI 3,445,814
SYSTEM FOR INTERROGATING REMOTE STATIONS VIA POWER LINES OF AN ELECTRICAL DISTRIBUTION NETWORK
Filed March 24, 1964 Sheet 2 of 2

INVENTOR.
ALFRED SPÄLTI

BY Morgan Finnegan Durham & Pine

ATTORNEYS

United States Patent Office 3,445,814

Patented May 20, 1969

3,445,814

SYSTEM FOR INTERROGATING REMOTE STATIONS VIA POWER LINES OF AN ELECTRICAL DISTRIBUTION NETWORK

Alfred Spälti, Zug, Switzerland, assignor to Electrometre SA, Zug, Switzerland, a corporation of Switzerland Filed Mar. 24, 1964, Ser. No. 354,254
Int. Cl. H04q 9/02, 9/06
U.S. Cl. 340—151 24 Claims

ABSTRACT OF THE DISCLOSURE

A power line communication system including transmitters with resonant circuits periodically connected to the power line according to a predetermined time sequence so as to provide a redundant, amplitude modulated signal. Apparatus is associated with the transmitter for changing the modulation frequency in accordance with commodity consumption. Receiver equipment coupled to the power line is tuned to the fundamental frequency of the transmitted signal and is arranged to detect the amplitude modulation.

This invention relates to communication or telemetering systems, and more particularly to systems wherein information is conveyed via power lines of an electrical distribution network.

Existing electrical power supply networks are quite extensive and reach virtually all locations, particularly within metropolitan areas. It has long been known that the supply lines making up the distribution network could conveniently be used to convey information between various transmitter and receiver stations coupled to the distribution network. In the past, the transmitter unit would normally comprise an audio signal generator which would be periodically activated to send out audio signals in accordance with a preselected code. The associated receiver unit would be capable of distinguishing the audio signals from the 50 or 60 cycle alternating voltage on the supply lines and would be capable of detecting the coded information. By properly selecting the operating frequencies and the times for transmissions, a large number of compatible communication system could be coupled to the same distribution network.

It has been found that the audio noise signal level on most power lines is quite substantial. Therefore, in order to achieve reliable communication, it is necessary to employ relatively elaborate transmitters capable of delivering relatively large transmitting powers so that the signal received at the receiver station will exceed the noise signal level. It has primarily been the cost of constructing these transmitter units, as well as the cost of operating and maintaining them, which has limited the extent to which power lines have been used for communication purposes in the past.

Thus, it is an object of this invention to provide a relatively simple and inexpensive transmitter unit for superimposing information signals on supply lines of an electrical distribution network.

It is another object to provide a system for transmitting information via supply lines of an electrical distribution network system employing relatively simple transmitter units which can be operated and maintained at nominal cost.

Still another object is to provide a system for transmitting information via supply lines of an electrical distribution network and which is not significantly affected by the noise inherent in the distribution network.

The transmitter unit in accordance with this invention includes a simple resonant circuit, preferably a resonant circuit including a capacitance and series connected inductance, and an associated timing device for periodically connecting the resonant circuit to the supply lines. The timing device is constructed so that the time interval between successive connections of the resonant circuit to the supply lines is different from the half-cycle interval of the alternating voltage and the supply lines, or integral multiples thereof. The receiver unit includes a synchronously operating timing device and is capable of detecting signals superimposed upon the supply lines by the periodic connections of the resonant circuit in the transmitter unit. It has been found that, in a system in accordance with this invention, reliable communication can be achieved by employing as little as a few watts of transmitting power.

Systems which convey information via the electrical power distribution network are particularly useful in combination with public utility consumption metering devices. The size of public utilities which supply gas, water and electricity is ever increasing and hence, the gathering of information indicating the quantity of consumption by particular consumers is likewise becoming an ever increasing task. Thus, there is a continuing need for a better way of gathering consumption data.

To simplify this task, consumption metering devices have been developed which provide a given signal after a predetermined quantity of a consumer commodity has been consumed or after consumption of several commodities having a predetermined monetary value. These consumption metering devices do not provide signals representative of an actual measured value in the sense of a meter reading, but instead indicate consumption of an amount agreed upon with the customer i.e., a so-called fixed amount. The output indication from this metering device may be indicated by the position of a two-position signal switch. In other words, the switch is in one position while a first fixed amount is consumed, is in the alternate position while a second fixed amount is consumed, returns to the first position while a third fixed amount is consumed, etc. Accurate information for billing the customer can be ascertained by periodically noting the position of the switch.

A further object of this invention is to provide a relatively inexpensive system adapted to gather, at a central station, consumption data representative of the consumption of various commodities at various remote locations.

Still another object of the invention is to provide a system for systematically gathering consumption data from a large number of dispersed consumers.

In the system for gathering consumption data in accordance with this invention, each consumer station is provided with one or more fixed amount type consumption metering devices and a transmitter unit coupled to the electrical supply lines. If the signal switch of the metering device is in one position, the associated transmitter unit is conditioned to send out one type of signal, whereas, if the signal switch is in the alternate position, the transmitter unit is conditioned to send out a different type of signal. All transmitted signals from consumer stations in a conductively connected area of the electrical distribution network are received by the same district receiver station. This is accomplished by interrogating a plurality of consumer stations simultaneously, each such simultaneously interrogated station being designed to provide electrically distinguishable signals. Data from a number of consumption metering devices at the same consumer station, i.e., separate metering devices for gas, water, and electricity, may be gathered sequentially via the same transmitter unit.

The collected data at the district receiver station is relayed to a central station either via electrical supply lines or via some other suitable communication system. At the central station the consumption data is compared with the previous reading for the same customer. If both readings are the same, it is known that the customer has not yet consumed the agreed upon fixed amount. On the other hand, if the readings are different, it is known that the fixed amount has been consumed and that therefore it is time to bill the customer.

The manner in which the foregoing and other objects are achieved in accordance with this invention is set forth more fully in the following specification which describes illustrative embodiments of the invention. The drawings form a part of this specification wherein.

In the electrical supply lines, the frequency of the alternating voltage is, for example, 50 cycles per second and its period is therefore 20 milliseconds (abbreviated to ms.). When an electrical resonant circuit, comprising an inductance and a capacitance, is connected to the supply lines, an alternating pulse signal is formed having a frequency of the resonant circuit. The initial amplitude of this signal is proportional to the instantaneous value of the voltage present on the supply at the time of the connection and its logarithmic decay is dependent on the damping provided by the resonant circuit.

When the resonant circuit is disconnected, the capacitative member thereof has a charge equal in polarity and magnitude to the instantaneous value of the voltage present on the supply lines at the time of disconnection. In order to obtain the greatest possible current surge when the resonant circuit is again connected to the supply lines, the resonant circuit should next be connected during a half-cycle of the supply line voltage having opposite polarity. In accordance with this invention, the resonant circuit is again connected when the instantaneous value of the supply line voltage is different from that existing at the time of preceding disconnection.

Figures 1, 2, 2A, 2B:
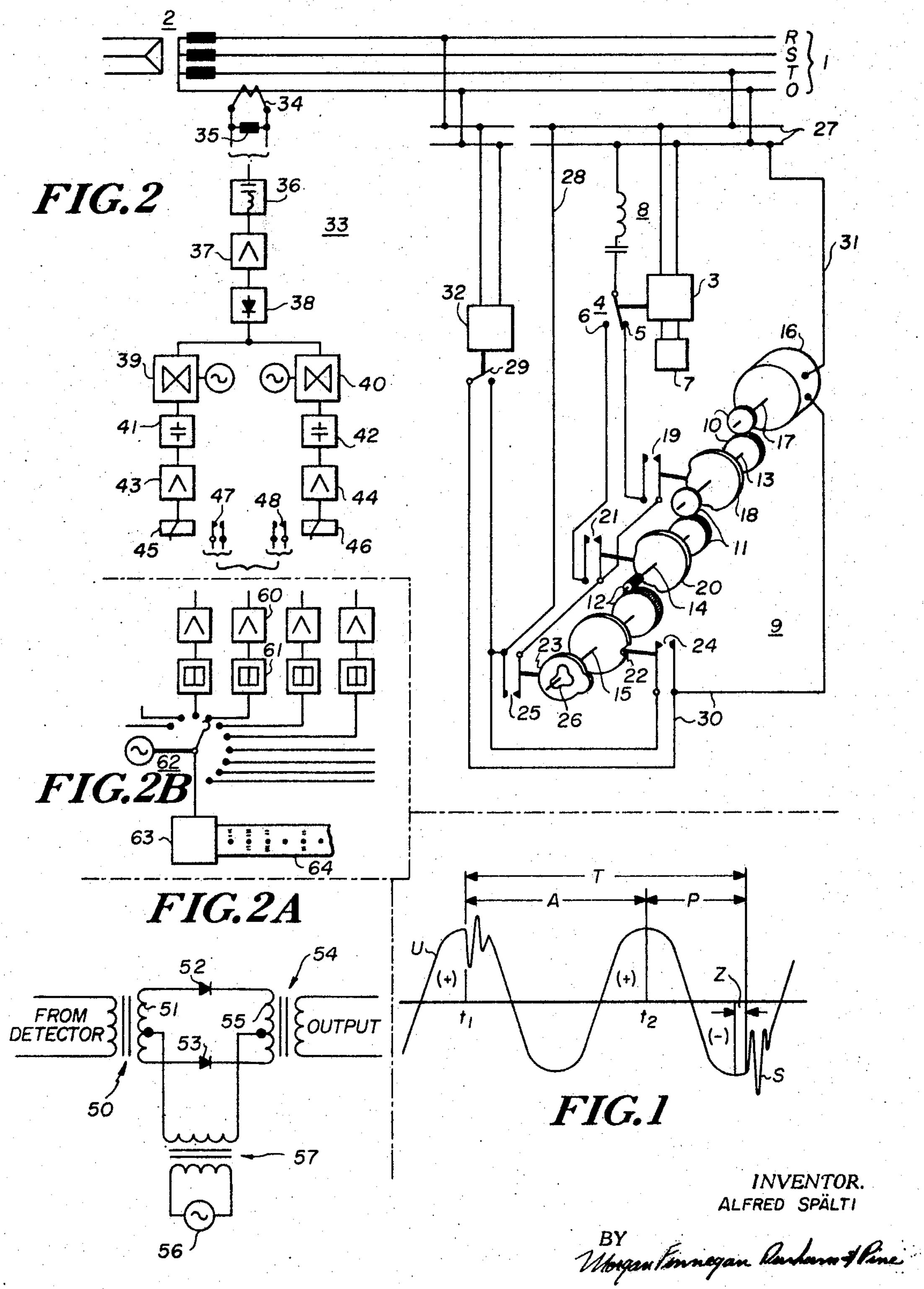
FIG. 1 is a voltage-time graph showing the communication signals superimposed upon the network alternating voltage.
FIG. 2 is a diagram of a communication system in accordance with the invention including a consumer station and an associated district receiver station.
FIG. 2A is a schematic diagram of a demodulator unit for use in the system shown in FIG. 2.
FIG. 2B is a diagram illustrating a central receiver station associated with the district receiver station shown in FIG. 2.

For example, the time $t_1$ of the first connection may coincide with the peak value of a positive half-cycle of the supply line voltage V and the time of disconnection $t_2$ would then coincide with the peak value of the next positive half-cycle as illustrated in FIG. 1. The duration A of the connection of the resonant circuit is then one period of the supply line voltage, that is to say 20 ms. The second connection, which follows after a pause P, takes place only a short time Z, for example 2 ms., after the peak value of the negative half-cycle of the supply line voltage following the positive half-cycle at which the circuit was disconnected. In this example, the overall period T between successive connections of the resonant circuit is 32 ms. The duration A of the connection and the duration of the pause P thus differ in size.

In the example, the time of connection coincides with that of the peak positive value of the supply line voltage after every five connecting periods T, representing a total time of 160 ms. During this 160 ms. period the amplitude of the first voltage surge produced upon connection varies between a maximum value and a value of zero or approximately zero, depending upon the instantaneous value of the supply line voltage at the time of the first connection in a series of five connections. The combined effect of successive groups of pulses is to provide a signal having an effective frequency of $1/160$ ms. i.e., =6.25 cycles per second in this example. Other effective frequencies can be obtained by varying the connection period T.

The communication system and the construction of components for the same are illustrated in FIG. 2. A consumer station and an associated receiver station are shown coupled to an electrical distribution network including three phase supply lines 1 supplied by a local distribution transformer 2. The consumer station is coupled to supply lines 1 by means of a single-phase branch line 27.

The consumption metering device 3 at the consumer station is illustrated as an electrical watt-hour type metering device and is connected between branch line 27 and the load device 7 at the consumer station. The metering device is illustrated in detail in a copending application, assigned to the assigner of this invention, Serial Number 8,398, filed Feb. 12, 1960, in the name of Abraham Rutenberg and entitled "Method of Accounting for the Consumption of Electricity, Gas or Liquid and Arrangements for Carrying Out Such Method." Metering device 3 controls the position of a two-position signal switch 4 which includes stationary contacts 5 and 6. While a first fixed amount is being consumed, signal switch 4 is in one position, for example, with the movable contact coupled to stationary contact 5. Thereafter, while a second fixed amount is being consumed, signal switch 4 is in the alternate position with the movable contact coupled to stationary contact 6; while a third fixed amount is being consumed the signal switch is in the initial position; etc.

The transmitter unit at the consumer station includes a resonant circuit 8 and timing apparatus 9 coupled to branch line 27. If signal switch 4 is in one position, timing apparatus 9 is operative to periodically connect the resonant circuit to the supply lines with the time interval between successive connection being of one predetermined value, whereas, if signal switch 4 is in the alternate position, timing apparatus 9 is operative to periodically connect the resonant circuit to the supply lines with a different time interval between successive connections. Thus, when the transmitter unit is activated, a signal representative of the signal switch position is superimposed upon the alternating voltage of the supply lines. The superimposed signal is thereafter detected at a district receiver station 33.

Timing apparatus 9 includes three shafts, 13, 14, 15 coupled by pairs of gears 10, 11, 12, so that the shafts have different rotary speeds which are in a fixed relationship to the speed of a driving shaft 17 moved by a suitable clock mechanism, or, as illustrated, by a synchronous motor 16. A cam plate 18, operative to actuate a first impulse switch 19, is fixed on the shaft 13, and a cam plate 20, operative to actuate a second impulse contact 21 is fixed on shaft 14. On shaft 15 there are two further cam plates 22 and 23, cam plate 22 being operative to actuate a motor switch 24 and cam plate 23 being operative to actuate a main switch 25. Cam plate 23 can be rotated relative to cam plate 25 by virtue of a friction clutch 26.

Branch line 27 has a single phase connection to the low voltage supply lines 1. A connecting conductor 28 leads from one conductor of branch line 27 to the parallel connection of the impulse switches 19 and 21 via main switch 25. Impulse switch 19 is electrically connected to stationary contact 5 and impulse switch 20 is electrically connected to stationary contact 6.

Resonant circuit 8 is connected between the movable contact arm of signal switch 4 and the other conductor of branch line 27. The resonant circuit may include an inductor and a series connected capacitor as shown in FIG. 2, or in some cases may include only a capacitor with the inductance in the supply lines completing the resonant circuit.

The operating voltage for synchronous motor 16 is supplied through connecting conductors 28, 30 and 31, and one or the other of control switch 29 or motor switch 24. The control switch is operated by a unit 32 which can be a time switch or a remotely operated receiver unit. If a time switch is provided, the same unit may also be used to drive timing apparatus 9. The time switch or receiver unit can be used not only to actuate the system being described, but may also fulfill other functions such as changing the tariff, connecting and disconnecting consumers, etc., although these additional functions are not illustrated in the drawings. The same time switch or receiver unit can be utilized to operate a plurality of separate transmitter units in which case there would be a corresponding number of control switches 29.

The information to be transmitted is indicated by the movable contact position of signal switch 4 and may take one of two different forms since signal switch 4 is a two position switch. Signal switch 4 can have more than two positions, in which case the information may take as many different forms as there are different positions. In the simplest case, the information can be indicated by the presence or absence of a signal, in which case signal switch 4 would be a simple on-off switch.

Each stationary contact of signal switch 4 is connected to a different impulse switch. Timing apparatus 9, therefore, includes as many impulse switches and associated cam plates as there are contact elements on signal switch 4. In the embodiment illustrated in FIG. 2 there are two stationary contacts 5 and 6, and hence, two corresponding impulse switches 19 and 21 and two corresponding cam plates 18 and 20.

The nature of the device 3 is unimportant for the considerations which follow, but the fact that it is shown as a consumption meter illustrates an application of the system according to the invention which brings out the advantages and technical significance of the invention, as will be explained later.

As shown in the drawing, the resonant circuit 8 is electrically connected in series with signal switch 4 and one or the other of the impulse switches 19 and 21. The resonant circuit is therefore connected to the supply lines each time the impulse switch connected thereto is closed, provided that main switch 25 is closed. As already mentioned, this connection, when completed gives rise to electrical oscillations S (FIG. 1) which are superimposed upon the supply line alternating voltage as signal pulses and are thus carried by the supply lines.

The time interval T between the successive connections of the resonant circuit, and thus, the duration of a switching cycle for a particular impulse switch, is determined by the shape of the associated cam plate and the rotary speed of the cam plate. The duration of a time interval T is chosen so that it is different for each cam plate and different from the half-cycle period of the supply line alternating voltage or integral multiples thereof. By way of example, a value of 32 ms. was previously mentioned, but 11 ms. or 31.25 ms. and many other values could be used. Preferably values should be selected which are near to an odd multiple of the half-cycle period of the supply line alternating voltage since they produce modulation frequencies sufficiently different from interference frequencies as well as harmonics of the supply line voltage. It is desirable that the period A (FIG. 1), during which an impulse switch is closed, be of a different length, preferably longer, than the period P during which the impulse switch is open.

When control switch 29 is closed, synchronous motor 16 is energized and drive shaft is set in motion at a constant rotary speed of, for example, 50 revolutions per second. Shortly after shaft 17 begins to rotate, motor switch 24 closes and keeps synchronous motor 16 energized for one complete revolution of cam plate 22.

A predetermined period of time after motor 16 is energized, main switch 25 closes for a period of time determined by the configuration of cam plate 23, for example, 1.5 seconds. During this time, resonant circuit 8 is periodically connected to the supply lines by either impulse switch 19 or 21 depending upon the state of signal switch 4. This produces the signals of the type previously described with respect to FIG. 1. These signals are superimposed upon the supply line alternating voltage during the period in which main switch 25 remains closed.

The information represented by the electrical state of the signal switch 4 now appears in the communication channel as a series of impulses. The amplitude of the first of these impulses, which is particularly important for transmission, is modulated by virtually 100% and has a frequency representative of the state of the signal switch 4. These representative frequencies may be 6.25 cycles per second, 4 cycles per second or the like.

Unit 32, which can be either a receiver responsive to received supply line impulses, or a timing mechanism, is connected to control switch 29. The information at the consumer station may be called up at any desired time by closing switch 29. It is possible to call up information from a plurality of consumer stations by using but a single unit 32 coupled to a corresponding plurality of control switches 29. At the moment of the call, i.e., when the control switches 29 close, the timing apparatus 9 at each of the consumer stations begins its operation. If cam plates 23 are suitably adjusted, the main switches 25 of the various simultaneously started timing mechanisms 9 can be made to close at different times so that the transmitter units give out their information one after the other without the information overlapping. The sequence at which the signal transmitters give out their information is fixed and serves to identify the individual transmitter. The associated central receiving station is programmed in accordance with this sequence, and can thus associate each series of impulses arriving at the receiving station with a specific transmitter.

The impulses superimposed on the supply line alternating voltage are received at a district receiver station 33. The receiver station is designed so that one set of relay contacts 47 are closed in response to the signals transmitted when signal switch 4 is in one position and so that a different set of relay contacts 48 are closed in response to signals transmitted when signal switch 4 is in the alternate position.

A current transformer 34 is coupled to one of the supply lines 1 and produces a signal, corresponding to the supply line signal, across a resistor 34, the resistor being connected across the transformer secondary winding. The signal developed across resistor 34 is passed through a bandpass filter circuit 36 which rejects unwanted frequencies, i.e., all frequencies other than the resonant frequency of resonant circuit 8. The signal appearing at the output of filter circuit 36 is, in essence, the same signal which was superimposed on the supply lines at the receiver station. The signal appearing at the output of the filter circuit is passed through an amplifier 37 and then through a detector circuit 38.

The fundamental frequency of the detected signal appearing at the output of detector circuit 38 has a direct relationship to the period of time between successive connections of the resonant circuit to the supply lines as compared to the alternating voltage on the supply lines. As was previously explained, if the period T between successive connections of a resonant circuit to a 50 cycle supply line is 32 ms., the fundamental frequency of the successive pulses is 6.25 c.p.s., and hence, the fundamental frequency of the signal emerging from detector circuit 38 is likewise 6.25 c.p.s. If the interval T is 31.25 ms., then a cycle is completed every eighth connection or every 250 ms., and the corresponding signal emerging from detector 38 has a fundamental frequency of 4 c.p.s.

If it is assumed that cam plate 18 is designed for a 32 ms. period T and cam plate 20 is designed for a 31.25 ms. period T, then two separate channels are connected to the output of detector circuit 38, one channel for detecting 6.25 c.p.s. signal, and the other for detecting a 4 c.p.s. signal. This is conveniently achieved by including a synchronous demodulator in each channel.

A typical synchronous demodulator circuit is shown in FIG. 2A including an input transformer 50 and an output transformer 54. The output from detector circuit 38 is coupled to the primary winding of transformer 50. The ends of the center tapped secondary winding 51 of transformer 50 are connected, respectively, to the anodes of diodes 52 and 53, the cathodes of these diodes being connected to the ends, respectively, of the center tapped primary winding 55 of output transformer 54. A suitable synchronizing signal is provided by a signal generator 56 which is coupled to the primary winding of a transformer 57. The secondary winding of transformer 57 is connected between the center taps of windings 51 and 55.

The synchronizing signal renders alternate ones of diodes 52 and 53 conductive during alternate half-cycles. An unidirectional signal is developed across the secondary winding of a transformer 54 only if the input signal has the same frequency as the synchronizing signal. It is possible for the input signal applied to transformer 50 to have a quadrative relationship to the synchronizing signal in which case no output signal is developed even though both signals have the same frequency. It is therefore desirable that each channel include a pair of demodulator circuits energized with synchronizing signals having a quadrative relationship. Thus, with two such demodulators, an output signal will always be provided if the input signal has the same frequency as the synchronizing signal regardless of the phase relationship between the signals. With the assumed conditions, demodulator unit 40 in one channel receives a synchronizing signal of 4 c.p.s., and demodulator unit 39 in the other channel receives a synchronizing signal of 6.25 c.p.s. These low frequency signals can easily be provided by a synchronous motor and cam driven switch arrangement.

The outputs of the demodulators are averaged by capacitive averaging circuits 41 and 42, amplified by amplifier 43 and 44 and then applied to relays 45 and 46. The one of contacts 47 and 48 which is closed provides an indication of the then existing position of signal switch 4. In cases where the signal switch at the consumer station has more than two positions, additional channels are required at the receiving station, i.e., a separate channel for each switch position.

At a defined point in time, the position of contacts 47, 48 at the receiving station represent the electrical state of the signal switch 4 at a specific consumer station. In many applications information received from various consumer stations can be evaluated at the district receiver station. But in certain other applications, it is desirable for the information received from several consumer stations to be passed on to a central receiving station through another communication channel such as a telephone network.

The central receiver station is shown in FIG. 2B and includes an input amplifier 60 and an information storage unit 61 for each of the individual district receiving stations coupled thereto. The information placed in the individual storage units 61 may be extracted by means of a selector switch 62 and thereafter fed to an information converter 63, for example, a tape perforator. The information is thus translated into a form which can easily be evaluated mechanically. The storage units 61 are cleared after each revolution of the selector switch 62 in a manner conventional in the art. As all the means cooperating in transmitting the information are synchronized, it is possible to discover exactly which consumer station provided each piece of recorded information by using time markers on a perforated tape 64 discharged from information converter 63.

Other types of mechanical control systems can be used in place of that shown in FIG. 2. The impulses applied to the power lines can be generated by purely electronic switching members, or with the aid of oscillating-reed contacts, or by tuning fork controlled impulse switches. It is also possible for the signal switch 4 itself to be controlled by tuning forks or oscillating reeds so that it acquires the properties of an impulse transducer which generates different impulse frequencies in each position.

The invention makes it possible for information to be reliably transmitted in any direction with very simple low powered transmitting and receiving apparatus, and permits transmission over an extensive distribution network subject to many sources of interference. Interference signals within the frequency pass-band of filter 36 adversely can affect the transmission of information only if they are also modulated with one of the selected modulation frequencies and if they last for approximately a second, which is highly improbable.

The invention provides a great technical advance particularly in the field of ascertaining and charging for the consumption of public consumer commodities as will now be briefly explained.

The increasing extension of supply systems for public consumer commodities such as electricity, gas, water and the like, brings about increased expenditures for ascertaining and charging for consumption.

It has previously been proposed to provide consumption meters which provide an indication after a given amount of a consumer material has been consumed, or after a quantity of one or more different consumer materials corresponding to a given monetary amount has been consumed. This indication can be in the form of an A.C. signal of a given frequency, and can be transmitted through a public electrical distribution network, telephone network, or the like, to a control and accounts department of a public utility company undertaking to provide the consumer commodity. Thus, transmitted data is not an actual measured value, but merely data indicating the consumption of an amount agreed on with the consumer.

Since nearly all consumers of public consumer commodities are connected to electrical power lines, it is the electrical distribution network which is best suited for use as a communication channel. In view of the large number of required consumption meters it is necessary that the transmitting apparatus be very simple in construction and require no significant maintenance. Transmission of information must also be very reliable. The system provided according to this invention fulfills these conditions.

The registry of the amount consumed, with the aid of the system described, begins with the transmission of a control command from the central receiver station (FIG. 2B) to all, or a group of, the district receiver stations which in turn cause the associated timing mechanisms 9 of all, or some, of the consumer stations incorporated in the system to begin operating. This can be accomplished by sending a pulse to receiver unit 32 via the district receiver station so that receiver unit 32 will in turn close control switch 29 to start the timing mechanism at the consumer station. As previously described, data signals are then received at the central receiver (FIG. 2B) in a fixed sequence. The signal from each consumer station is compared with the signal received from the same station in a previous transmission. If the signal received from a consumer station corresponds to a first position of signal switch 4 on one transmission, and the signal corresponds to the alternate position of the signal switch 4 on the next transmission, this indicates that the meter has measured the consumption of a given amount of the consumer commodity in question.

So long as the control switch 29 remains closed, the transmissions are periodically repeated. These transmissions preferably take place during the hours when the electrical distribution system carries a small load, for example during the night. In the system according to this invention, a maximum of three seconds, including the interval before the next transmission, is required to transmit the information from one consumer station. This gives rise to relatively high transmission speeds, which are of decisive importance if the apparatus for determining consumption is to be used in practice.

Figure 3:
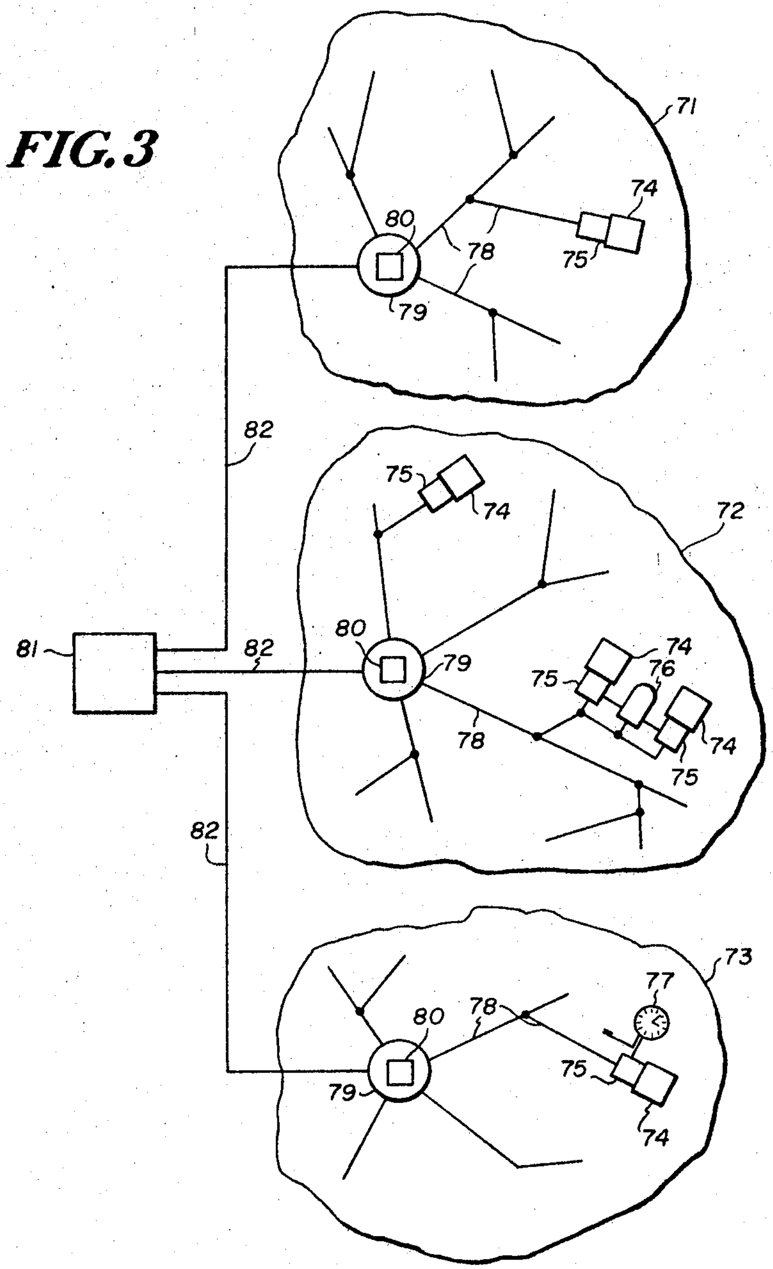
FIG. 3 is a diagram showing a system for gathering consumption data coupled to an electrical distribution network.

A system for gathering consumption data from three district areas 71, 72 and 73 is shown schematically in FIG. 3. There are a plurality of consumer stations within each district area, each such consumer station including one or more consumption meters 74 for measuring consumption of gas, water, electricity and the like. A transmitter unit 75, of the type previously described, is integrally associated with each consumption meter and is coupled to the local electrical supply lines.

Preferably, a signal receiver unit, such as unit 76 shown in district 72, is associated with each transmitter unit or group of transmitter units. Receiver unit 76 may be of any desired type and may be responsive to signals transmitted via the electrical supply lines, radio signals or telephone signals. When receiver unit receives a signal, referred to as an interrogate signal, the associated transmitter units 75 are actuated and transmit the consumption data derived from the associated consumption meters 74. In cases where more than one transmitter unit is associated wtih the same receiver unit 76 as shown in district 72, the transmitter units are programmed to either transmit consumption data sequentially or at different frequencies.

A time clock mechanism 77 as shown in district 73 can be used as an alternative for the receiver unit shown in district 72. The time clock mechanism is programmed to periodically actuate one or more associated transmitter units 75. Typically, the time clock mechanism would be programmed to actuate the associated transmitter units at a preselected time during each day, preferably during the night hours.

The extent of district areas 71, 72 and 73 is determined by the electrical distribution network, and each include all consumer stations conductively connected via the electrical supply lines 78. Normally, a conductively connected area will include all consumer stations coupled to supply lines which are connected to the same distribution transformer at a substation 79 within the district. Conveniently, a district receiver unit 80 is located at the substation. The receiver unit at the substation can be connected in series with one or more of the conductors, or can be coupled to the conductors by means of a suitable current transformer. In most installations the electrical distribution system will be a four wire three phase system, in which case the receiver unit at the substation is best coupled to the neutral conductor since transmitted signals from single phase branch lines would normally appear on this neutral conductor. Normally, a resistance is connected across the secondary winding of the current transformer to develop a usable signal. The district receiver unit also includes a band-pass filter which permits the modulated impulse signals to pass through, and also includes a suitable amplifier in amplifying the signals which pass through through the filter circuit.

In its simplest form the district receiver 80 comprises the above mentioned current transformer with its lead resistance and a band-pass filter which passes only the alternating signals having the frequencies characteristic of the transmitted signals. The alternating signals may pass along any suitable communication channel 82 without further amplification to central receiver 81 equipped with a suitable signal receiver and with storage and evaluating means. Depending on the transmission qualities of the communication channel 82, it may be desirable to connect a simple amplifier downstream of the band-pass filter.

It is also possible for district receiver 80 to convert the information received from the various consumer stations into another form suitable for forwarding to the central receiver. This may also be done, for example, by connecting a signal discriminator downstream of the district receiver suitable for detecting each different type of signal which can be transmitted from the various consumer stations in combination with a tape perforator acting as an information translator and transferring the information received to a perforated tape. The perforated type may be collected from the district receiver station from time to time, and taken to a central station for evaluation. Also, the detected signals can be fed into a transmitting device at district receiver station 80, so that the data is relayed to the central receiver station and there transferred onto perforated tapes. It is, of course, possible to use different types of information translators, preferably ones with a storage facility.

Communication channel 82 may, for example, be a telephone line or any other communication channel such as via the high voltage distribution network. It is not necessary that communication channel 82 belong to the same distribution network as the district areas 71, 72 and 73. Also the low voltage supply lines included within the district areas may belong to different electrical distribution networks.

With systems of the type described it is indispensable that the signals transmitted from the consumption stations be transmitted with great reliability. This condition can be fulfilled in a system operating via the electrical distribution network utilizing very low transmitting powers even though there is a ihgh level of interference signals on the supply lines, provided the signals generated by the transmitter units 75 have sufficient redundance. The signal is redundant if it includes a surplus of component, over and above the minimum number of those components essential for recognition of the information conveyed by the signal.

It is therefore an advantage for the signals superimposed on the suply lines to be amplitude modulated alternating pulses with the signal amplitude varying periodically between a maximum and a minimum value. Frequency modulation can be used, and also a periodic variation of different types of modulation or even an aperiodic variation within a signal transmission can be used, in order to give the transmitted signal the necessary redundance. The modulation frequency is preferably about one order smaller than, and sufficiently different from, the supply line alternating voltage and harmonics.

Separation of the transmitted signals from the normal supply lines signals takes place either at central receiver 81 or at the district receiver 80. In the case of the amplitude modulated signals, separation is achieved by means of apparatus previously described with respect to FIG. 2.

In the usual and most simple system, the various consumer stations coupled to the system are interrogated sequentially. This is accomplished by sending interrogation signals to actuate the various selected transmitters via their associated receiver units 76, or by appropriately programming the timing units 77. Preferably each consumption meter 74 is of the fixed amount type including a two position signal switch which is in one position while a first fixed amount is consumed, is in the alternate position while a second fixed amount is consumed, returns to the first position while a third fixed amount is consumed, etc. The associated transmitter unit 75 is preferably of the type previously described with respect to FIG. 2, which when activated by the associated receiver unit 76 or timing device 77, produces a redundant amplitude modulated signal of one type if the signal switch is in one position and of a different type if the signal switch is in the alternate position.

The signals provided by transmitter units 75 are superimposed upon the alternating supply line voltage and conveyed to the district receiver station 80. The interrogation is arranged so that the various transmitter units 75 transmit their information sequentially, one unit at a time, without any overlap of signals. The transmission sequence is established so that the time at which a signal is received at the district or central receiver station serves to identify the individual transmitter units.

The information collected at the district receiver stations is relayed on to central receiver station 81 via communication channels 82. This information is then evaluated at the central receiver station by comparing the received consumption data with the consumption data received by the previous interrogation of the same consumer station. If the consumption data is the same as was received on the previous interrogation, it is known that the customer has not yet consumed the agreed upon fixed amount. On the other hand, if the data from two successive interrogations is not the same, it is known that the customer has completed consumption of the agreed upon fixed amount since the previous interrogation, and hence, that it is time to bill the customer.

The time interval between successive interrogations of a particular consumer station depends upon the agreed upon fixed amount and the anticipated consumption rate. It is essential that the time between successive interrogations be substantially less than the minimum time in which the customer could consume the fixed amount to eliminate any possibility of a customer consuming a fixed amount between successive interrogations.

Although only a few illustrative embodiments of the invention have been described in detail, it should be obvious that there are a large number of variations within the scope of this invention.

What is claimed is:

1. Apparatus for transmitting signals through AC supply lines comprising, a transmitter coupled to the supply lines, said transmitter including first means for superimposing at least one electrical impulse upon the supply lines when connected thereto; switching means for periodically connecting and disconnecting said first means; second means for controlling the operation of said switching means so that the time interval between successive connections of said first means to the supply lines is different from the half-cycle time period of the normal alternating voltage on the supply lines and integral multiples thereof; and a receiver coupled to the supply lines and responsive to signals superimposed on the supply lines.

2. Apparatus in accordance with claim 1 wherein said second means is operative to control said switching means so that said first means is connected to the supply lines for a period of time different from the time interval during which said first means is disconnected.

3. Apparatus in accordance with claim 1 wherein said second means is operative to control said switching means so that the period of time during which said first means is connected to the supply lines is greater than the period of time during which said first means is disconnected.

4. Apparatus in accordance with claim 1 wherein said second means is operative to control said switching means so that the time interval between said successive connections is very little different from the time interval of an odd multiple of the half-cycle time period of the normal alternating voltage on the supply lines.

5. Apparatus for transmitting signals through AC supply lines comprising, a transmitter coupled to the supply lines, said transmitter including resonant circuit means having an electrical energy storage element connected therein, switch means for periodically connecting said resonant circuit means to the supply lines and for periodically disconnecting the same; controlling means for controlling the operation of said switching means so that the time interval between successive connections of said resonant circuit means to the supply lines is different from the half-cycle time period of the normal alternating voltage on the supply lines and integral multiples thereof; and receiver means responsive to signals superimposed on the normal supply line alternating voltage when said resonant circuit means is periodically connected to the supply lines.

6. Apparatus in accordance with claim 5 wherein said controlling means is operative to control said switching means so that successive connections of said resonant circuit means occur at times when the instantaneous potentials on the supply line are of opposite polarities.

7. Apparatus in accordance with claim 5 wherein said resonant circuit means comprises a series resonant circuit including an inductance in series with a capacitance.

8. Apparatus in accordance with claim 7 wherein said controlling means is operative to control said switching means so that said resonant circuit means is connected to the power lines for a period of time approximately equal to one full cycle of the alternating voltage normally appearing on the power lines and is next connected for a similar period of time when the instantaneous potential on the power lines is of the opposite polarity.

9. Apparatus in accordance with claim 5 wherein said switching means includes a mechanical switch and said controlling means comprises a cam mechanism for periodically actuating said switch.

10. Apparatus in accordance with claim 5 further comprising a signal switch having at least two positions, each position representative of information to be transmitted, and wherein said switching means includes at least two mechanical impulse switches each connected to said resonant circuit means, and wherein said controlling means comprises at least two cam mechanisms each associated with a different one of said impulse switches and operative to periodically actuate the associated impulse switch for non-identical periods of time, said signal switch being operative to render one or the other of said impulse switches effective to control connections and disconnections of said resonant circuit means.

11. Apparatus in accordance with claim 10 further comprising a constant speed drive motor for driving said cams.

12. Apparatus in accordance with claim 10 further comprising a control switch for determining the interval during which said resonant circuit means can periodically be connected to the power lines.

13. In a system for communicating via power lines of an electrical distribution network, information representative of consumption of a consumer commodity at a remote location, the combination of a signal switch having at least two positions; metering means for measuring consumption of a consumer commodity at a remote location and operatively connected to said signal switch to place the same in the alternate one of said positions each time a predetermined quantity of a commodity has been consumed; resonant circuit means; first and second impulse switch means, said first impulse switch being operative to periodically connect said resonant circuit means to the power lines, and to disconnect the same, when said signal switch is in one of said positions, said second impulse switch means being operative to periodically connect said resonant circuit means to the power lines, and to disconnect the same, when said signal switch is in the alternate one of said positions, the time interval between successive connections effected by means of said first impulse switch being different from those effected by means of said second impulse switch, receiver means coupled to the power lines and operative to detect pulses superimposed upon the power lines by means of successive connections of the resonant circuit; and circuit means connected in said receiver means responsive to the time spaced sequence of said superimposed pulses to thereby indicate the position of said signal switch.

14. Apparatus in accordance with claim 13 further comprising a control switch for selectively enabling said first and second impulse switches when it is desirable to determine the position of said signal switch.

15. A consumption meter interrogating system comprising a plurality of remotely located consumption meters, each such consumption meter including a signal switch having a position representative of consumed fixed quantities, a district receiver station, an electrical distribution network, first impulse transmitter means for communicating information to said district receiver station, said impulse transmitter means being coupled to said district receiver means via said electrical distribution network, means coupled to said impulse transmitter and said signal switch for repetitively connecting said impulse transmitter to the supply line at intervals determined according to the electrical state of each signal switch associated with a consumption meter, the time interval between successive connections being different from the half-cycle time period of the normal alternating voltage of the supply lines and integral multiples thereof, a central receiver station, and second means for relaying said information to said central receiver station for evaluation.

16. A system in accordance with claim 15 wherein said first means includes a transmitter unit associated with each consumption meter and operative to provide at least two different amplitude modulated impulse signals, each of said different signals being representative of a different position of said signal switch.

17. A system in accordance with claim 16 wherein said amplitude modulated signals are substantially redundant so that said information will be conveyed to said district receiver station even though a portion of the transmitted signal may be lost during the transmission.

18. A system in accordance with claim 16 wherein said district receiver station includes band-pass filtering means operable to pass only the fundamental frequency of said impulse signals.

19. A system in accordance with claim 18 wherein said district receiver station further comprises circuit means coupled to said band-pass filtering means and operative to provide an output indication when the received signal has a selected modulation frequency.

20. A system in accordance with claim 15 wherein said district receiver station includes an information translator for producing a permanent record of received information.

21. A system in accordance with claim 20 wherein said information translator is a tape perforator.

22. A system in accordance with claim 15 further comprising a receiver unit associated with each consumption meter, said receiver units being responsive to interrogation signals and operative in response thereto cause transmission of information from said associated consumption meter to said district receiver station via said first means.

23. A system in accordance with claim 15 further comprising timer means associated with each consumption meter, said timer means being operative to periodically cause transmission of information from said associated consumption meter to said district receiver station via said first means.

24. A system in accordance with claim 15 wherein the information from individual ones of said consumption meters is transmitted sequentially via said first means, and wherein said central receiver station includes means for determining the source of a transmitted signal in accordance with the time received.

References Cited

UNITED STATES PATENTS

| | | | |
|---|---|---|---|
| 2,287,786 | 6/1942 | Diamond et al. | |
| 2,981,940 | 4/1961 | Garwin | 340—310 |
| 3,266,018 | 8/1966 | Higgins | 340—151 |
| 2,357,995 | 9/1944 | Blomberg et al. | 340—310 |
| 2,581,056 | 1/1952 | Walmsley et al. | 340—152 |
| 2,672,598 | 3/1954 | Hornfeck et al. | 340—151 |
| 2,719,284 | 9/1955 | Roberts et al. | 340—151 |
| 3,164,771 | 1/1965 | Milford | 340—151 |

JOHN W. CALDWELL, *Primary Examiner.*

HAROLD I. PITTS, *Assistant Examiner.*

U.S. Cl. X.R.

340—147, 150, 152, 310